US00RE41832E

(19) United States
(12) Reissued Patent
Hashimoto et al.

(10) Patent Number: US RE41,832 E
(45) **Date of Reissued Patent: *Oct. 19, 2010**

(54) METHOD FOR DRIVING A GAS-DISCHARGE PANEL

(75) Inventors: Yasunobu Hashimoto, Kawasaki (JP); Yasushi Yoneda, Kawasaki (JP); Kenji Awamoto, Kawasaki (JP); Seiichi Iwasa, Kawasaki (JP)

(73) Assignee: Hitachi Plasma Patent Licensing Co., Ltd, Tokyo (JP)

( * ) Notice: This patent is subject to a terminal disclaimer.

(21) Appl. No.: 12/389,281

(22) Filed: Feb. 19, 2009

Related U.S. Patent Documents

Reissue of:
(64) Patent No.: 6,680,718
Issued: Jan. 20, 2004
Appl. No.: 09/427,934
Filed: Oct. 27, 1999

U.S. Applications:
(62) Division of application No. 11/335,899, filed on Jan. 20, 2006.

(30) Foreign Application Priority Data

Nov. 20, 1998 (JP) ..... 10-330447

(51) Int. Cl.
*G09G 3/28* (2006.01)

(52) U.S. Cl. ..... 345/63; 345/60; 345/66; 345/67; 345/204; 345/690; 315/169.1; 315/169.4

(58) Field of Classification Search ..... 345/60, 345/63, 66, 67, 68, 76, 77, 204, 690; 315/169.1, 315/169.4
See application file for complete search history.

(56) References Cited

U.S. PATENT DOCUMENTS 3,854,072 A 12/1974 Trogdon
3,906,451 A 9/1975 Strom
4,063,131 A 12/1977 Miller
4,063,141 A 12/1977 Levine
4,430,601 A 2/1984 Boyd et al.
4,611,203 A 9/1986 Criscimagna et al.
5,420,602 A 5/1995 Kanazawa
5,541,618 A 7/1996 Shinoda
5,656,893 A 8/1997 Shino
5,663,741 A 9/1997 Kanazawa
5,745,086 A 4/1998 Weber (Continued)

FOREIGN PATENT DOCUMENTS

EP 0 157 248 10/1985
EP 0 680 067 11/1995
EP 0 762 373 3/1997
EP 0 764 931 3/1997

(Continued)

OTHER PUBLICATIONS

Extended European Search Report, issued in corresponding European Patent Application No. 07111007.6 on Nov. 26, 2007.

Korean Office Action dated Mar. 7, 2006 of Application No. KR 10–1999–0047475.

Larry F. Weber, "Plasma Display Device Challenges," Asia Display '98, pp. 15–27.

*Primary Examiner*—My-Chau T Tran
(74) *Attorney, Agent, or Firm*—Antonelli, Terry, Stout & Kraus, LLP

(57) ABSTRACT

When performing the line-sequential addressing for setting the state of each of the cells arranged in rows and columns that constitute a display screen, discharge is generated that has intensity in accordance with display data corresponding to each of all cells belonging to the selected row for each selection of the row. Thus, the priming effect in the following discharge is generated.

17 Claims, 12 Drawing Sheets

U.S. PATENT DOCUMENTS

| | | | | |
|---|---|---|---|---|
| 5,757,343 | A | 5/1998 | Nagakubo | |
| 5,790,087 | A | 8/1998 | Shigeta et al. | |
| 5,835,072 | A | 11/1998 | Kanazawa | |
| 5,852,347 | A | 12/1998 | Marcotte | |
| 5,874,932 | A | 2/1999 | Nagaoka et al. | |
| 5,877,734 | A | 3/1999 | Amemiya | |
| 5,943,031 | A | 8/1999 | Tokunaga et al. | |
| 5,952,986 | A | 9/1999 | Nguyen et al. | |
| 5,982,344 | A | 11/1999 | Tokunaga | |
| 6,020,687 | A | 2/2000 | Hirakawa et al. | |
| 6,034,482 | A | 3/2000 | Kanazawa et al. | |
| 6,097,358 | A | 8/2000 | Hirakawa et al. | |
| 6,118,416 | A | 9/2000 | Nakamura et al. | |
| 6,124,849 | A | 9/2000 | Ito et al. | |
| 6,140,984 | A | 10/2000 | Kanazawa | |
| 6,160,529 | A | 12/2000 | Asao et al. | |
| 6,160,530 | A | 12/2000 | Makino | |
| 6,181,305 | B1 * | 1/2001 | Nguyen et al. | 345/60 |
| 6,184,848 | B1 | 2/2001 | Weber | |
| 6,195,072 | B1 | 2/2001 | Iwami et al. | |
| 6,211,865 | B1 | 4/2001 | Hosoi et al. | |
| 6,243,084 | B1 | 6/2001 | Nagai | |
| 6,249,087 | B1 | 6/2001 | Takayama | |
| 6,256,001 | B1 | 7/2001 | Kim | |
| 6,262,699 | B1 | 7/2001 | Suzuki et al. | |
| RE37,444 | E | 11/2001 | Kanazawa | |
| 6,320,560 | B1 | 11/2001 | Sasaki et al. | |
| 6,342,874 | B1 | 1/2002 | Tokunaga et al. | |
| 6,369,781 | B2 | 4/2002 | Hashimoto et al. | |
| 6,369,782 | B2 | 4/2002 | Shigeta | |
| 6,373,452 | B1 | 4/2002 | Ishii | |
| 6,400,342 | B2 | 6/2002 | Hirakawa | |
| 6,414,653 | B1 | 7/2002 | Kobayashi | |
| 6,456,263 | B1 | 9/2002 | Hashimoto et al. | |
| 6,707,436 | B2 | 3/2004 | Setoguchi et al. | |
| 6,738,033 | B1 | 5/2004 | Hibino | |
| 6,747,614 | B2 * | 6/2004 | Takayama | 345/60 |
| 6,965,359 | B2 | 11/2005 | Ishii et al. | |
| 6,982,685 | B2 | 1/2006 | Hashimoto | |
| 2006/0050094 | A1 | 3/2006 | Ishii et al. | |

FOREIGN PATENT DOCUMENTS

| | | |
|---|---|---|
| EP | 0 810 577 | 12/1997 |
| EP | 1152388 | 11/2001 |
| EP | 1152389 | 11/2001 |
| EP | 1262945 | 12/2002 |
| EP | 1262946 | 12/2002 |
| FR | 2 726 390 | 5/1996 |
| JP | 6-175607 | 6/1994 |
| JP | 7-175438 | 6/1995 |
| JP | 8-160910 | 6/1996 |
| JP | 08-160912 | 6/1996 |
| JP | 08-212930 | 8/1996 |
| JP | 9-6280 | 1/1997 |
| JP | 09-006280 | 1/1997 |
| JP | 9-160525 | 6/1997 |
| JP | 10-055152 | 1/1998 |
| JP | 10-91116 | 4/1998 |
| JP | 10-105111 | 4/1998 |
| JP | 10-177363 | 6/1998 |
| JP | 10-188824 | 7/1998 |
| JP | 10-214057 | 8/1998 |
| JP | 10-222119 | 8/1998 |
| JP | 10-247456 | 9/1998 |
| KR | 1997-0051699 | 7/1997 |
| KR | 1999-0071717 | 9/1999 |
| WO | WO 97/20301 | 6/1997 |

* cited by examiner

RAMP WAVEFORM

OBTUSE WAVEFORM

STEP-LIKE WAVEFORM

METHOD FOR DRIVING A GAS-DISCHARGE PANEL

Matter enclosed in heavy brackets [ ] appears in the original patent but forms no part of this reissue specification; matter printed in italics indicates the additions made by reissue.

*This is a Divisional application of U.S. Reissue application Ser. No. 11/335,899, filed Jan. 20, 2006, which is a Reissue of U.S. application Ser. No. 09/427,934, filed Oct. 27, 1999, now U.S. Pat. No. 6,680,718, and is a co-pending application of U.S. application Ser. No. 12/388,870, and is also related to Reissue application Ser. No. 12/684,818, filed Jan. 8, 2010 and Reissue application Ser. No. 12/684,811, filed Jan. 8, 2010, the contents of which are incorporated herein by reference.*

BACKGROUND OF THE INVENTION

1. Field of the Invention

The present invention relates to a method for driving a gas-discharge panel such as a plasma display panel (PDP) or a plasma addressed liquid crystal (PALC), and a display device using the gas-discharge panel.

A plasma display panel is coming into wide use as a large screen display device for a television set taking advantage of commercialization of color display. Along with the expansion of the market, requirement for reliability of operation has become more rigorous.

2. Description of the Prior Art

As a color display device, an AC type plasma display panel having three-electrode surface discharging structure is commercialized. This device has a pair of main electrodes for sustaining discharge disposed for each row of matrix display, and an address electrode for each column. Diaphragms for suppressing discharge interference between cells are disposed like a stripe. A discharge space is continuous over the entire length of each column. This AC type plasma display panel utilizes a memory function performed by wall charge on a dielectric layer covering the main electrodes on occasion of displaying. Namely, one pair of main electrodes is assigned to a scanning electrode and the address electrode is assigned to a data electrode for addressing by a line-sequential format for controlling the charging state of each cell corresponding to the display contents. After that, a sustaining voltage (Vs) having alternating polarities is applied to all pairs of the main electrodes simultaneously. Thus, a cell voltage (Vc) that is a sum of the wall voltage (Vw) and the applied voltage can exceeds a discharge starting voltage (Vf) only in a cell having a wall discharge above a predetermined quantity, so that the surface discharge occurs along the surface of the substrate for each application of the sustaining voltage. By shortening the period of applying the sustaining voltage, continuous displaying state can be observed.

Concerning a display of sequential images like a television, the addressing and the sustaining are repeated. In general, in order to prevent fluctuations of the display, preparation of addressing is performed for making the charged stale uniform over the entire screen, after sustaining of an image and before addressing of the next image.

In the conventional addressing, the charged quantity of the wall charge (wall voltage) is altered by generating the addressing discharge in either the cell to be lighted or the cell not to be lighted. In the writing address format, the wall charge remaining in the display screen is erased as preparation for addressing, and the addressing discharge is generated only in the cell to be lighted, so that an adequate quantity of wall charge is generated in the cell. In the erasing address format, an adequate quantity of wall charge is generated in all cells as preparation of addressing, and then the addressing discharge is generated only in the cell not to be lighted, so that the wall charge in the relevant cell is erased.

SUMMARY OF THE INVENTION

In the above-mentioned line-sequential addressing, the charge that contributes to the priming effect helping the addressing discharge occur easily is a space charge remaining after generated by the discharge for the preparation of addressing and a space charge generated by addressing discharge in the cell in the upstream side of the row selection (scanning). However, if the cell in the upstream side is not required to generate the addressing discharge (like a cell not to be lighted in the write addressing format), only the space charge remaining after generated at the stage of the preparation for addressing can contribute to the priming effect since the addressing discharge is not generated in the upstream side. Since the space charge decreases along with time passing, the remaining quantity of the space charge will be smaller, as the addressing is coming to an end, so that delay of discharging becomes larger. For this reason, in a cell of a row that is selected at relatively late timing, there was a case where the addressing discharge cannot occur within the row selection period (scanning period for one row) defined by a scan pulse width, resulting in a display defect. An example of the display defect is a "black noise" in which a part or a whole of the upper edge of a belt cannot be lighted, when the belt is displayed in the lower portion of the screen that is scanned vertically. Especially, in the structure in which the discharge space is defined by a diaphragm having a stripe pattern for each column, movement of the space charge generating the priming effect can occur only in each column, resulting in a display defect.

A method for improving the above-mentioned problem is proposed in Japanese Unexamined Patent Publication 9-6280(A), in which a priming discharge for forming the space charge is generated in the row to be selected before applying the scanning pulse that selects the row. The priming discharge is generated in all cells of the row regardless of the display contents, so that the addressing discharge almost surely occurs.

However, in the conventional driving method, since a priming pulse for generating the priming discharge is applied to the next row to be selected at the same time as application of the scanning pulse to the selected row, it is difficult to optimize the pulse width and the peak value, so that the control becomes complicated. In addition, since the pulse width should be set to a little larger for ensuring generation of the priming discharge, the priming pulse should be applied for each row, and the time necessary for the addressing becomes longer. If the timing for applying the pulse is shifted between rows, the row selection period becomes a sum of the priming pulse width and the scanning pulse width, so that the time necessary for the addressing becomes even longer.

The object of the present invention is to improve the reliability of the addressing while suppressing enlargement of the time necessary for the addressing.

In the present invention, while addressing for controlling the state of the cell in accordance with the state setting data such as display data, it is not selected whether the addressing discharge exists or not, but the quantity of addressing discharge (movement of the electric charge). Namely, a voltage sufficient for generating addressing discharge above the minimum value regardless of the display contents is applied to all of the cells to be addressed. The intensity of the electric discharge depends on the applied voltage.

For example, when the line-sequential addressing is adopted, the space charge that contributes to the priming effect in the row that will be selected next is generated in all of the cells included in the selected row. Therefore, the addressing discharge can be certainly generated for any display pattern by performing the row selection in the order that makes the distance between the nth selected row and the (n+1)th selected row within a predetermined range so that the space charge generated by the addressing discharge becomes effective. If the scanning pulse width is shortened in accordance with increase of the probability of the addressing discharge, the display can be speed up.

The wall voltage can be varied by the addressing discharge in the addressing of the gas-discharge panel in which each cell is charged by the wall charge. Therefore, the wall voltage (the target value) before change is set so that the wall voltage after change becomes the desired value.

FIGS. 1A and 1B show the change in the wall voltage in the addressing of the AC type plasma display panel to which the present invention is applied.

The variation of the wall voltage can be adjusted by setting the intensity of the discharge. However, the variation of the electrode potential will vary either in the direction from a high level to a low level or the opposite direction. Therefore, the combination of lighting or not lighting and the intensity of the discharge includes two patterns as described below.

In the case of writing address format, the wall voltage Vw between main electrodes is set to a value Vw1 within a non-lighting range in which the sustaining discharge cannot be generated as a preprocess of the addressing process. The non-lighting range means a range in which the cell voltage does not exceeds the discharge starting voltage even if the sustaining voltage having the same polarity with the wall voltage Vw is applied. The lower limit of the non-lighting range is the threshold value Vth2 having the negative polarity, and the upper limit of the non-lighting range is the threshold value Vth1 having the positive polarity. In the addressing process, a strong addressing discharge is generated for the selected cell (the cell to be lightened), and the wall voltage Vw is changed to a value in the lighting range in which the sustaining discharge can be generated in the polarity opposite to the previous polarity. In the non-selected cell (the cell not to be lightened), a weak addressing discharge is generated for the priming. In this case, the wall voltage Vw is changed from the value Vw1 into a lower value (zero in the figure).

In the case of erasing address format, the wall voltage Vw between main electrodes is set to a value Vw2 within a lighting range in which the sustaining discharge can be generated as a preprocess of the addressing process. In the addressing process, a strong addressing discharge is generated for the non-selected cell, and the wall voltage Vw is changed from the value Vw2 into a value in the non-lighting range (zero in the figure). In the selected cell, a weak addressing discharge is generated for the priming. In this case, the wall voltage Vw is changed from the value Vw2 into a value Vw2' in the lighting-range.

DESCRIPTION OF THE PREFERRED EMBODIMENTS

Figure 2:
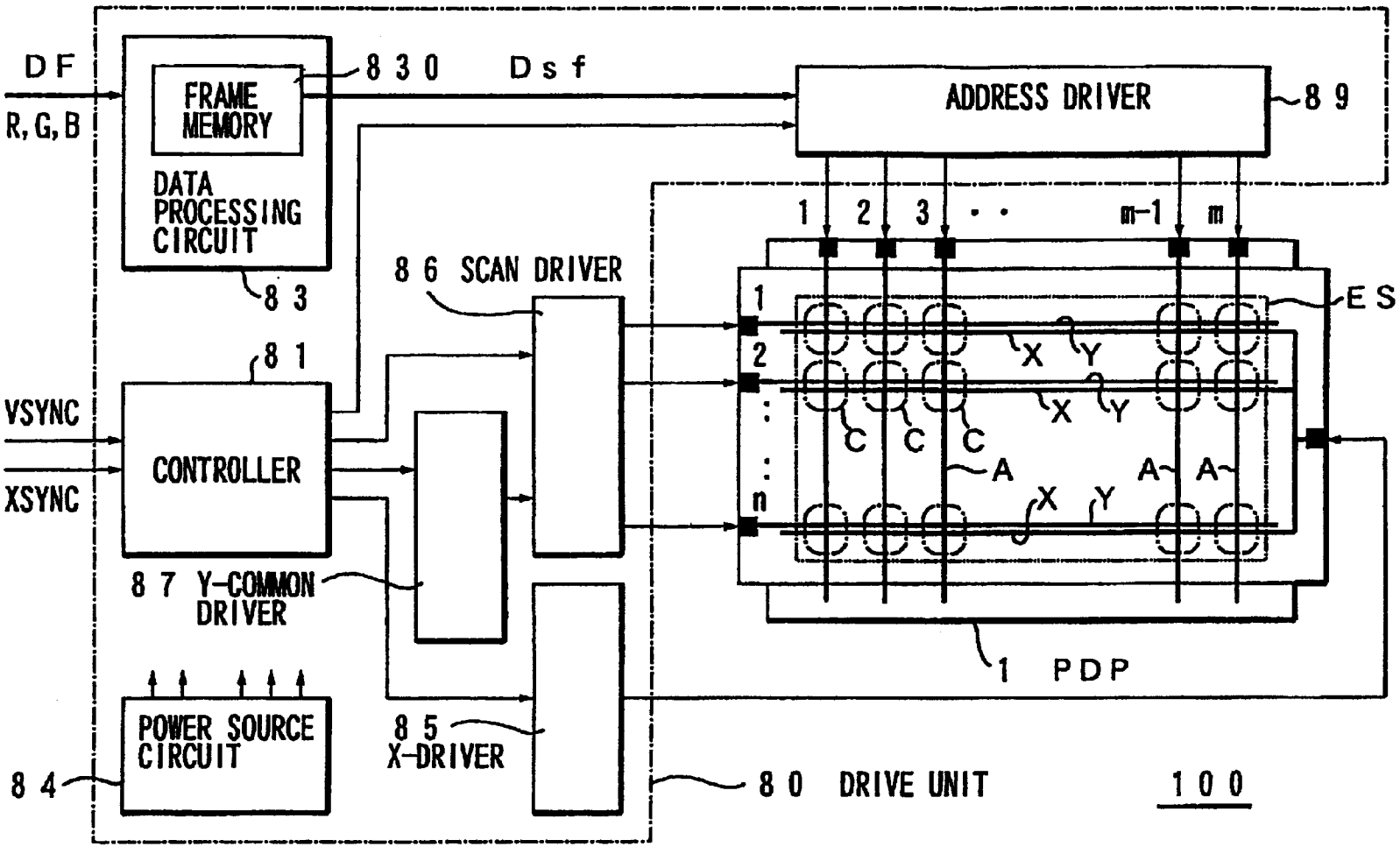
FIG. 2 is a schematic drawing of a plasma display device in accordance with the present invention.

FIG. 2 is a schematic drawing of a plasma display device 100 in accordance with the present invention.

The plasma display device 100 includes an AC type plasma display panel 1 that is of a thin-type and matrix-type color display device and a driving unit 80 for selectively lighting a plurality of cells C that make up a screen ES having m columns and n rows. The plasma display device 100 is used for a wall-hung television set or a monitor of a computer set.

The plasma display panel 1 has main electrodes X, Y that makes up electrodes pairs and are arranged in parallel for generating sustaining discharge (or also called display discharge). The main electrodes X, Y and address electrodes A cross each other in each cell C so as to form the three-electrode plane discharge structure. The main electrodes X, Y extend in the row direction (the horizontal direction) of the screen ES, and the main electrode Y is used for a scanning electrode that selects cells C row by row in addressing. The address electrodes A extend in the column direction (the vertical direction), and are used for a data electrode that select cells C row by row. The area where the group of the main electrodes and the group of the address electrodes in the substrates surface becomes the display area (i.e., the screen ES).

The driving unit 80 includes a controller 81, a data processing circuit 83, a power source circuit 84, an X-driver 85, a scan driver 86, a Y-common driver 87, and an address driver 89. The driving unit 80 is disposed at the rear side of the plasma display panel 1. Each driver and the electrodes of the plasma display panel 1 are connected electrically by a flexible cable (not shown). The driving unit 80 is provided with field data DF indicating intensity levels (gradation level) of colors R, G and B of each pixel from an external equipment such as a TV tuner or a computer, as well as various synchronizing signals.

The field data DF are temporarily stored in a frame memory 830 in the data processing circuit 83, and then are converted into subfield data Dsf. The subfield data Dsf are stored in the frame memory 830 and transferred to the address driver 89 at proper time. The value of each bit of the subfield data Dsf is information indicating whether the cell is required to be lightened or not in the subfield for realizing the gradation mentioned below. More specifically, it is information indicating whether the addressing discharge is strong or weak.

The X-driver 85 applies the driving voltage to all of the main electrodes X simultaneously. The electric commonality of the main electrodes X can be realized not only by the illustrated linkage on the panel in FIG. 2 but by wiring inside the X-driver 85 or by wiring of the connection cable. The scan driver 86 applies the driving voltage to the main electrode Y of the selected row in addressing. The Y-common driver 87 applies the driving voltage to all of the main electrodes Y simultaneously in sustaining. In addition, the address driver 89 applies the driving voltage to the total m of address electrodes A in accordance with the sub field data Dsf for generating the first or second intensity of addressing discharge. These drivers are supplied with a predetermined electric power by the power source circuit 84 via wiring conductors (not shown).

Figure 3:
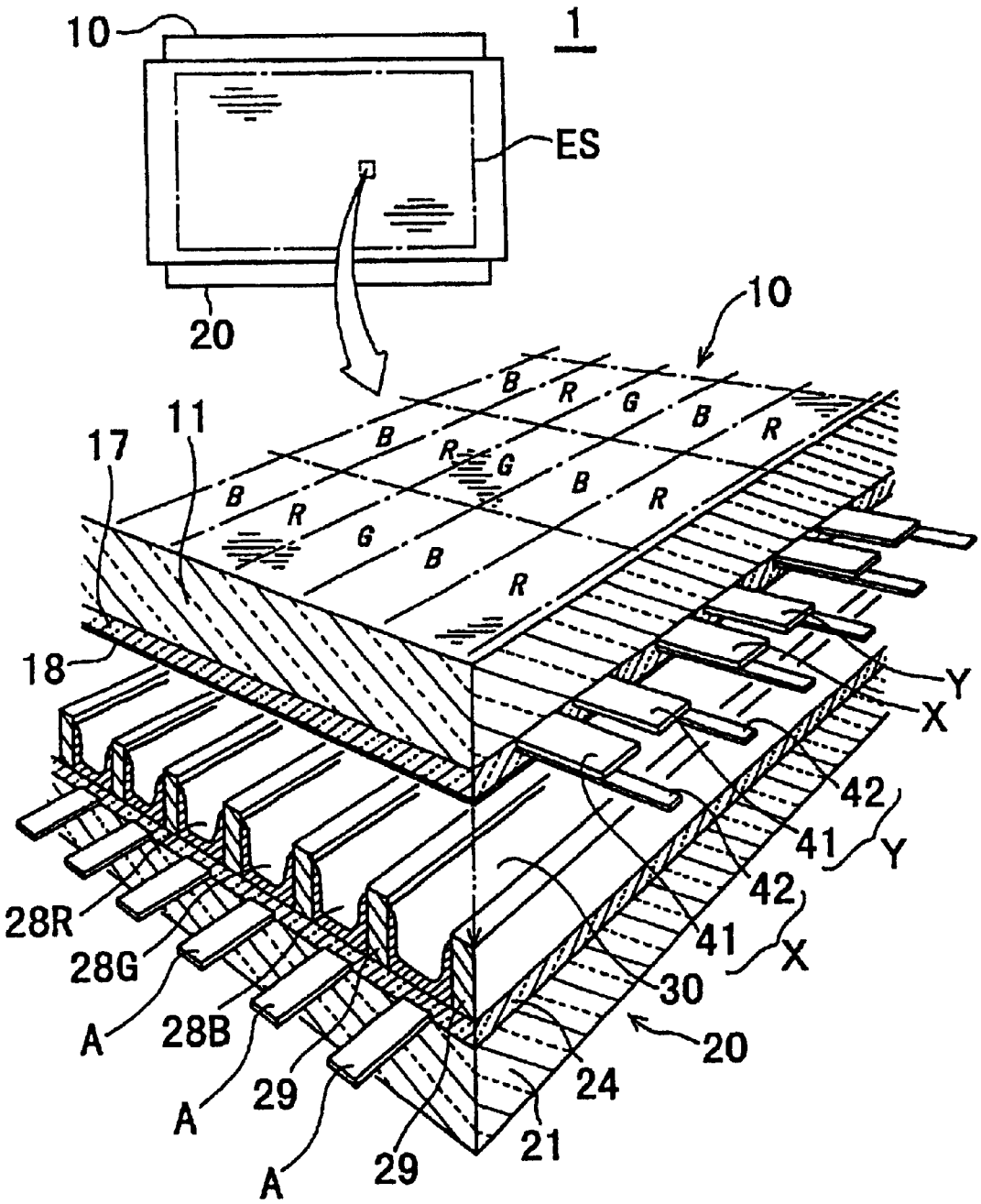
FIG. 3 is a perspective view showing the inner structure of the plasma display panel.

FIG. 3 is a perspective view showing the inner structure of the plasma display panel 1.

In the plasma display panel 1, a pair of main electrodes X, Y is arranged for each row on the inner side of a glass substrate 11 that is a base material of the front side substrate structure. The row is an array of cells in the horizontal direction in the screen. Each of the main electrodes X, Y includes a transparent conductive film 41 and a metal film (a bus conductor) 42, and is coated with a dielectric layer 17 that is made of low melting point glass and has thickness of approximately 30 microns. The surface of the dielectric layer 17 is provided with a protection film 18 made of magnesia (Mg0) having thickness of approximately several thousands angstroms. The address electrodes A are arranged on the inner surface of a glass substrate 21 that is a base material of the rear side substrate structure, and is coated with a dielectric layer 24 having thickness of approximately 10 microns. A diaphragm 29 having linear band shape of 150 micron height is disposed between the address electrodes A on the dielectric layer 24. Discharge spaces 30 are defined by these diaphragms 29 in the row direction for each subpixel (small lighting area), and the gap size of the discharge spaces 30 is defined. Three fluorescent layers 28R, 28G, 28B for red, green and blue colors are disposed so as to cover the inner wall of the rear side including the upper portion of the address electrode A and the side wall of the diaphragm 29. The discharge space 30 is filled with a discharge gas containing neon as the main ingredient and xenon. The fluorescent layers 28R, 28G, 28B are locally pumped to emit light by ultraviolet light emitted by the xenon gas on discharge. A pixel includes three subpixels aligned in the row direction. A structure in each subpixel is the cell (display element) C. Since the arrangement pattern of the diaphragm 29 is a stripe pattern, each part of the discharge space 30 corresponding to each column is continuous in the column direction over all rows.

A method for driving the plasma display panel 1 in the plasma display device 100 will be explained as follows. First, reproduction of the gradation will be explained generally, and then driving sequence that is unique to the present invention will be explained in detail.

Figure 4:
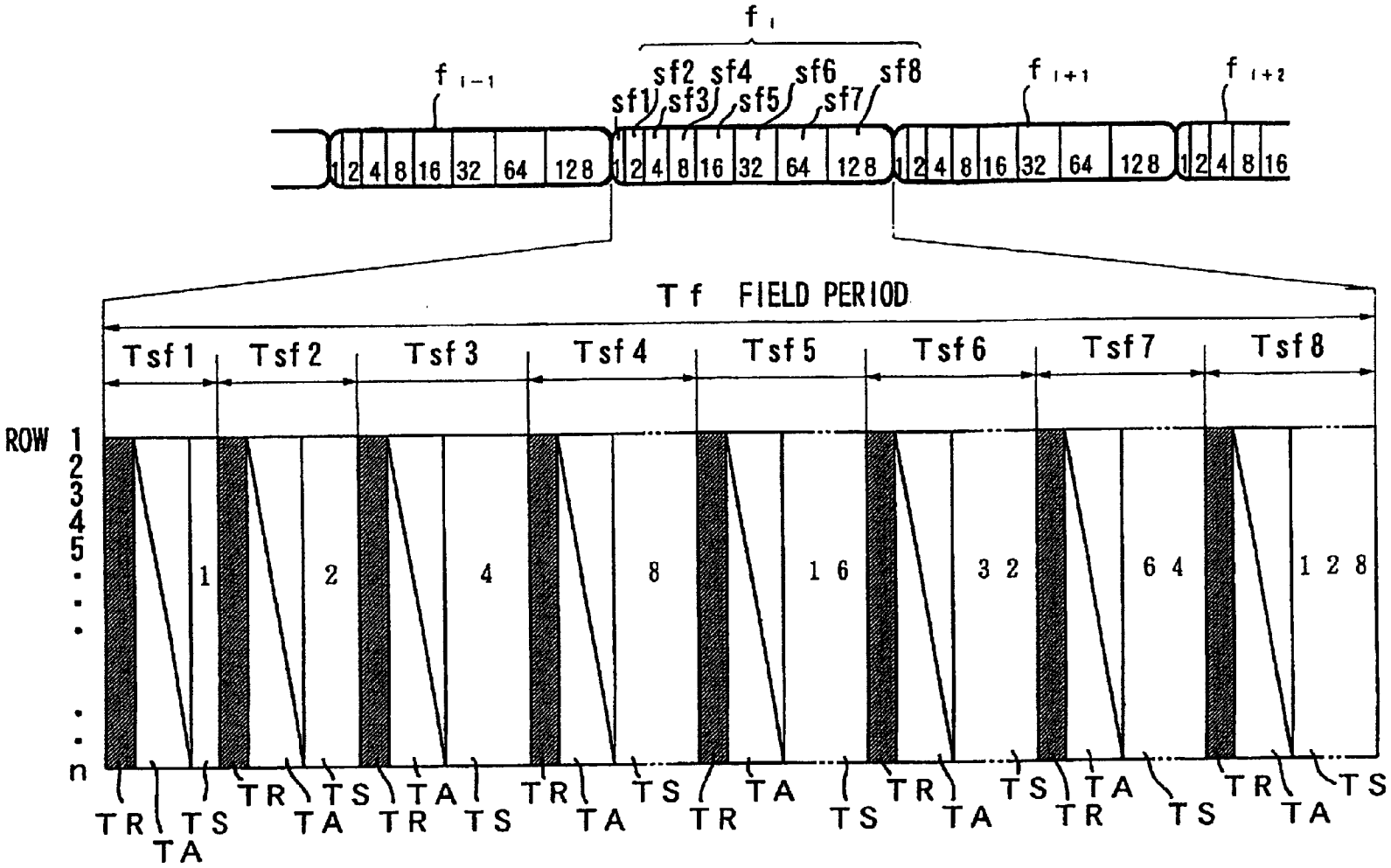
FIG. 4 is a diagram showing a structure of the field.

FIG. 4 shows a structure of the field.

The gradation is reproduced by controlling lighting with binary data in displaying a television image. Therefore, each field f of the sequential input image is divided into, for example, eight subframes sf1, sf2, sf3, sf4, sf5, sf6, sf7 and sf8 (the numerical subscripts represent display order). In other words, each field f that makes up the frame is replaced with eight subframes sf1–sf8. Each frame is divided into eight when reproducing a non-interlace image such as an output of a computer. Weights are assigned so that the relative ratio of the intensity in these subfields sf1–sf8 becomes approximately 1:2:4:8:16:32:64:128 for setting the number of sustaining discharge. Since 256 steps of intensity can be set by combination of light/non-light of each subfield for each color, R, G, B, the number of color that can be displayed becomes $256^3$. It is not necessary to display subfields sf1–sf8 in the order of the weight of intensity. For example, optimizing can be performed in such a way that the subfield sf8 having a large weight is disposed at the middle of the field period Tf.

The subfield period $Tsf_j$ that is assigned to each subfield $sf_j$ (j=1–8) includes a preparation period TR for adjusting charge by the ramp voltage, an address period TA for forming a charge distribution corresponding to a display contents and a sustain period TS for sustaining the lightened state so as to ensure the intensity corresponding to the gradation level In each subfield period $Tsf_j$, lengths of the preparation period TR and the address period TA are constant regardless of the weight of the intensity, while the larger the weight of the intensity, the longer the length of the sustain period TS becomes. Namely, the eight-subfield periods $Tsf_j$ corresponding to one field f are different from each other.

Figure 5:
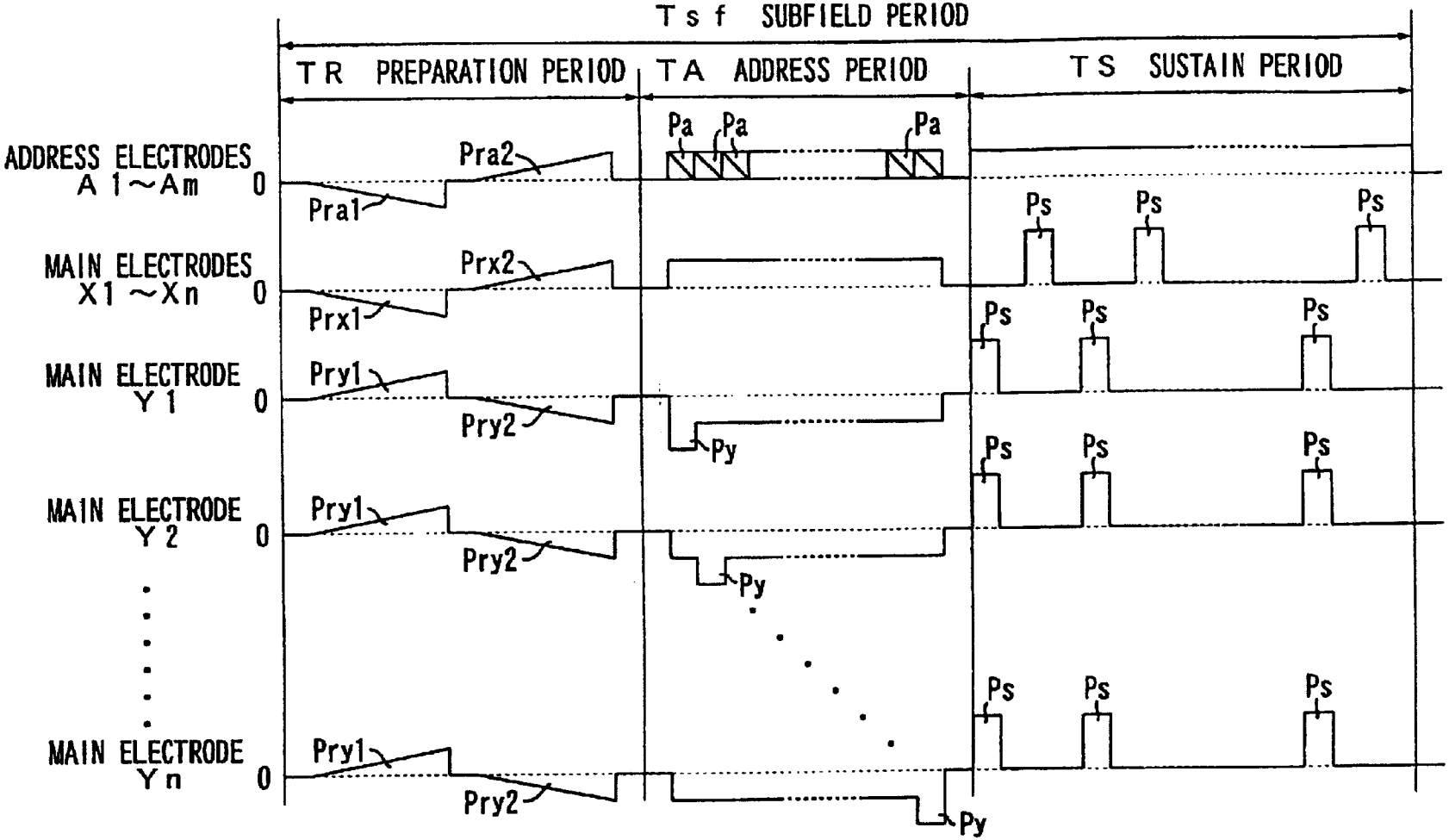
FIG. 5 shows voltage waveforms in a first example of the drive sequence.

FIG. 5 is a diagram of voltage waveforms showing a first example of the drive sequence. In this figure, main electrodes X, Y are denoted with a suffix (1, 2, . . . n) representing the arrangement order of the corresponding row, and the address electrodes A are denoted with a suffix (1–m) representing the arrangement order of the corresponding column. Other figures explained below will be in the same way.

The drive sequence that is repeated in every subfield is generally explained as follows.

In the preparation period TR, all of address electrodes A1–Am are supplied with the pulse Pra1 and the opposite polarity pulse Pra2 in sequence, all of the main electrodes X1–Xn are supplied with the pulse Prx1 and the opposite polarity pulse Prx2 in sequence, and all of the main electrodes Y1–Yn are supplied with the pulse Pry1 and the opposite polarity pulse Pry2 in sequence. The pulse application means to bias the electrode temporarily to a different potential from the reference potential (e.g., the grand level). In this example, pulses Pra1, Pra2, Prx1, Prx2, Pry1 and Pry2 are ramp voltage pulses having a rate of change that generates minute discharge. The pulses Pra1, Prx1 have the negative polarity, while the pulse Pry1 has the positive polarity. Application of the pulses Pra2, Prx2 and Pry2 having ramp waveforms enable the wall voltage to be adjusted into the value corresponding to the subtract of the discharge starting voltage and the pulse amplitude. The pulses Pra1, Prx1 and Pry1 are applied so that the "former lightened cell" that was lightened in the former subfield and the "former non-lightened cell" that was not lightened in the former subfield generate appropriate wall voltage.

In the address period TA, the scanning pulse Py is applied to the main electrodes Y1–Yn in the arrangement order. At the same time with this row selection, an address pulse Pa having the polarity opposite to the scanning pulse Py and the peak value corresponding to the subfield data Dsf of the selected row is applied to the address electrodes A1–Am. Namely, strong discharge is generated in the selected cell, while weak discharge is generated in the non-selected cell. When the scanning pulse Py and the address pulse Pa are applied, discharge occurs between the address electrode A and the main electrode Y, which becomes a trigger for generating discharge between the main electrodes X and Y. These sequential discharges, i.e., the addressing discharge, are related to a discharge starting voltage $Vf_{AY}$ between the address electrode A and main electrode Y (hereinafter, referred to as an electrode gap AY) and a discharge starting voltage $Vf_{XY}$ between the main electrodes X, Y (hereinafter, referred to as an electrode gap XY). Therefore, in the above-mentioned preparation period TR, adjustment of the wall voltage is performed for both the electrode gap XY and the electrode gap AY. The wall voltage between the electrode gaps AY may be a value such that the discharge cannot occur before applying the scanning pulse Py to the main electrode Y.

In the sustain period TS, a sustain pulse Ps having a predetermined polarity (plus polarity in the illustrated example) is applied to all of the main electrodes Y1–Yn at first. Then, the sustain pulse Ps is applied to the main electrodes X1–Xn and the main electrodes Y1–Yn alternately.

In this example, the final sustain pulse Ps is applied to the main electrodes X1–Xn. When the sustain pulse Ps is applied, a surface discharge will occur in the cell that is lighted this time and has remaining wall charge in the address period TA. Every time when the surface discharge occurs, the polarity of the wall voltage between electrodes changes. All of the address electrodes A1–Am are biased to the same polarity as the sustain pulse Ps in order to prevent unnecessary discharge in the sustain period TS.

Figure 1A:
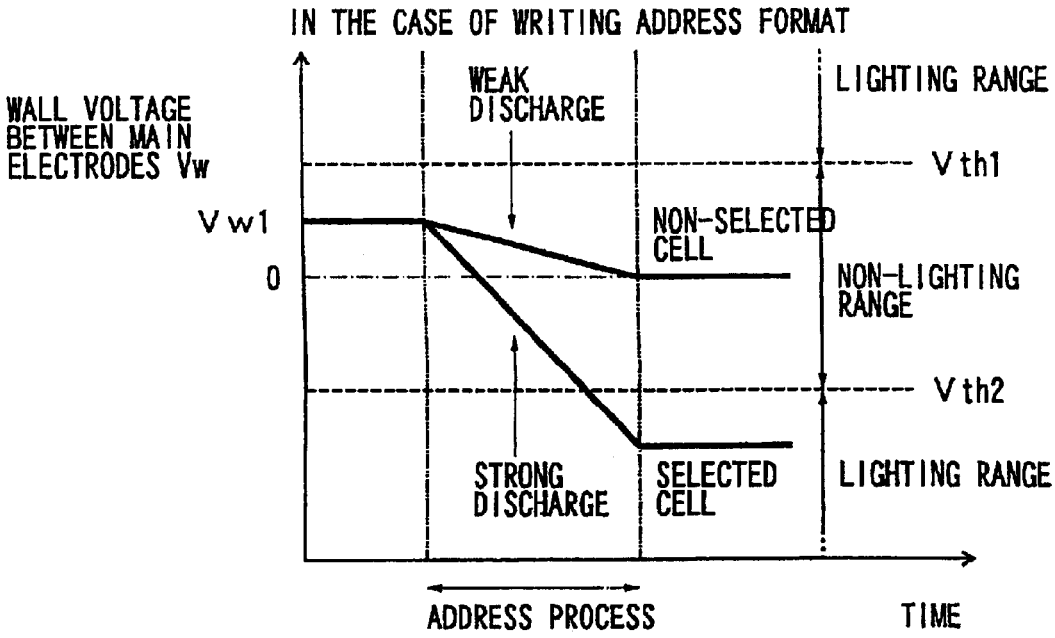
FIGS. 1A and 1B show variations of the wall voltage in the addressing of the AC type plasma display panel to which the present invention is applied.
Figure 1B:
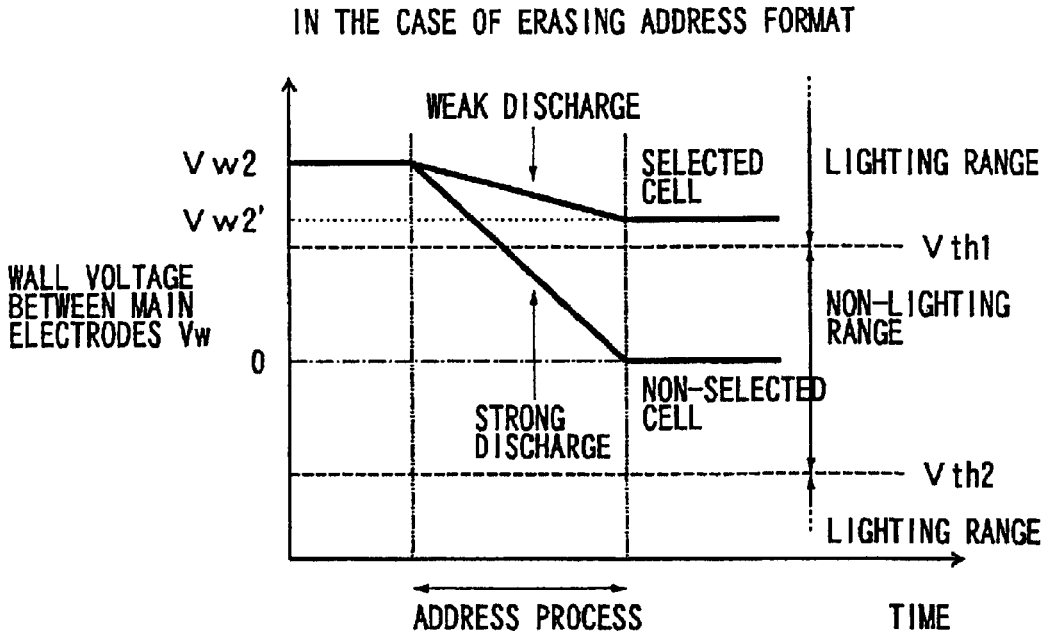

The wall voltage of the electrode gap XY at the end of the preparation period TR is represented by Vw1 (X side is positive), while the minimum value of the wall voltage of the electrode gap XY when the cell is lighted in the sustain period TS is represented by $V_{TH}$ (absolute value without polarity). In the plasma display panel 1, the main electrodes X, Y are arranged symmetrically with respect to the surface discharge gap. Therefore, the threshold levels Vth1, Vth2 shown in FIGS. 1A and 1B have relationship such that Vth1=$V_{TH}$ and Vth2=$-V_{TH}$. Concerning the selected cell, the strong addressing discharge makes the wall voltage of the electrode gap XY change from Vw1 to $-V_{TH}$ or below. Concerning the non-selected cell, a weak addressing discharge makes the wall voltage of the electrode gap XY changes to a value higher than $-V_{TH}$ and lower than $V_{TH}$ (preferably zero or a value nearly equal to zero).

In order to control the addressing discharge, wall voltage is preferably adjusted in the preparation process as explained In Japanese Patent Application No. 10-157107. Usage of the ramp wave in the preparation process makes the adjustment of the wall voltage easy. When plural minute discharges occur continuously or continuous discharges occur by applying the ramp wave voltage, the sum of the applied voltage and the wall voltage during discharge is maintained at the value almost equal to the discharge starting voltage. Therefore, a subtraction from the discharge starting voltage of the peak voltage (pulse amplitude) of the ramp wave becomes (i.e., yields) the wall voltage after the ramp wave is applied. Compared with a rectangular wave, the ramp wave has less quantity of light emission. It is also advantageous in reducing the background intensit.

Figure 12A:
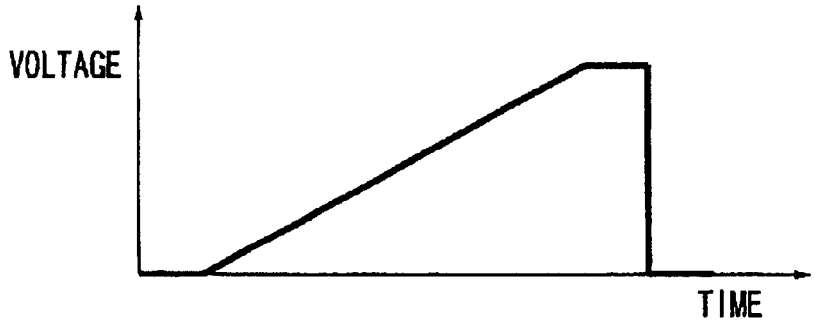
FIGS. 12A–12C show voltage waveforms of the addressing preparation period.
Figure 12B:
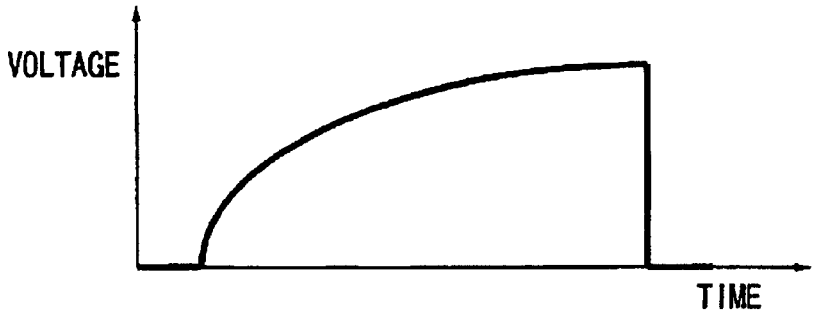
Figure 12C:
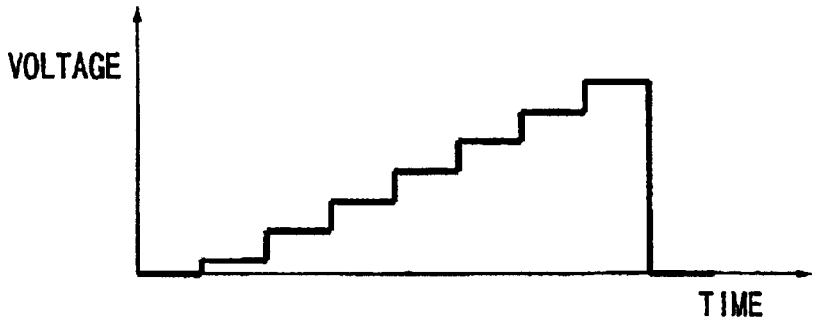

The voltage waveform used for the preparation process is not limited to a ramp wave. Only the requirement is that the voltage between the electrodes increases simply from the first set value to the second set value, while plural minute discharges can occur continuously or continuous discharges can occur. For example, the ramp waveform can be replaced with an obtuse waveform or a step-like waveform shown in FIG. 12. Alternatively, the voltage waveform may be a combination of plural waveforms selected from the ramp waveform, the obtuse waveform and the step-like waveform.

An example of the applied voltages is explained as follows. The discharge starting voltage of the electrode gap XY is 220 volts, the discharge starting voltage of the electrode gap AY is 170 volts. Hereinafter, concerning the polarity of the applied voltage and the wall voltage, the X side is regarded as positive in the electrode gap XY, while the A side is regarded as positive in the electrode gap AY.

In the preparation period TR, the widths of the pulses Pra1, Prx1 and Pry1 is 70 μs, the rate of potential change of the electrode gap XY is −4.2V/μs and the final voltage thereof is −300V, the ratio of voltage change of the electrode gap AY is −2.8V/μs and the final voltage thereof is −200V. The wall voltage at the end of the pulse application is 80V for the electrode gap XY and 30V for the electrode gap AY. The widths of the pulses Pra2, Prx2 and Pry2 are 25 μs, the rate of potential change of the electrode gap XY is 6.8V/μs and the final voltage is 170V.

The rate of potential change of the electrode gap AY is 6.8V/μs and the final voltage is 170V. The wall voltage at the end of the pulse application is 50V for the electrode gap XY and 0V for the electrode gap AY.

In the address period TA, the address electrode potential of the strong addressing discharge is 80V, the address electrode potential of the weak addressing discharge is 0V, and the potential of the main electrode X is 80V. The potential of the main electrode Y when the scanning pulse is applied is −140V, while the potential of the main electrode Y when the scanning pulse is not applied is 0V. The wall voltage of the electrode gap XY at the end of the strong addressing discharge is −120V, while the wall voltage of the electrode gap XY at the end of the weak addressing discharge is 0V.

In the sustain period TS, the amplitude of the sustain pulse Ps is 170V, and the address electrode potential is 85V. In this case, the minimum value of the wall voltage for generating the sustaining discharge is 70V.

In the conventional technique, addressing of a row needs 3 μs. However, in this example, since the addressing discharge in the upstream side of row selection contributes to the priming in the downstream, the address pulse Pa having the pulse width of 1 μs enables stable addressing.

Figure 6:
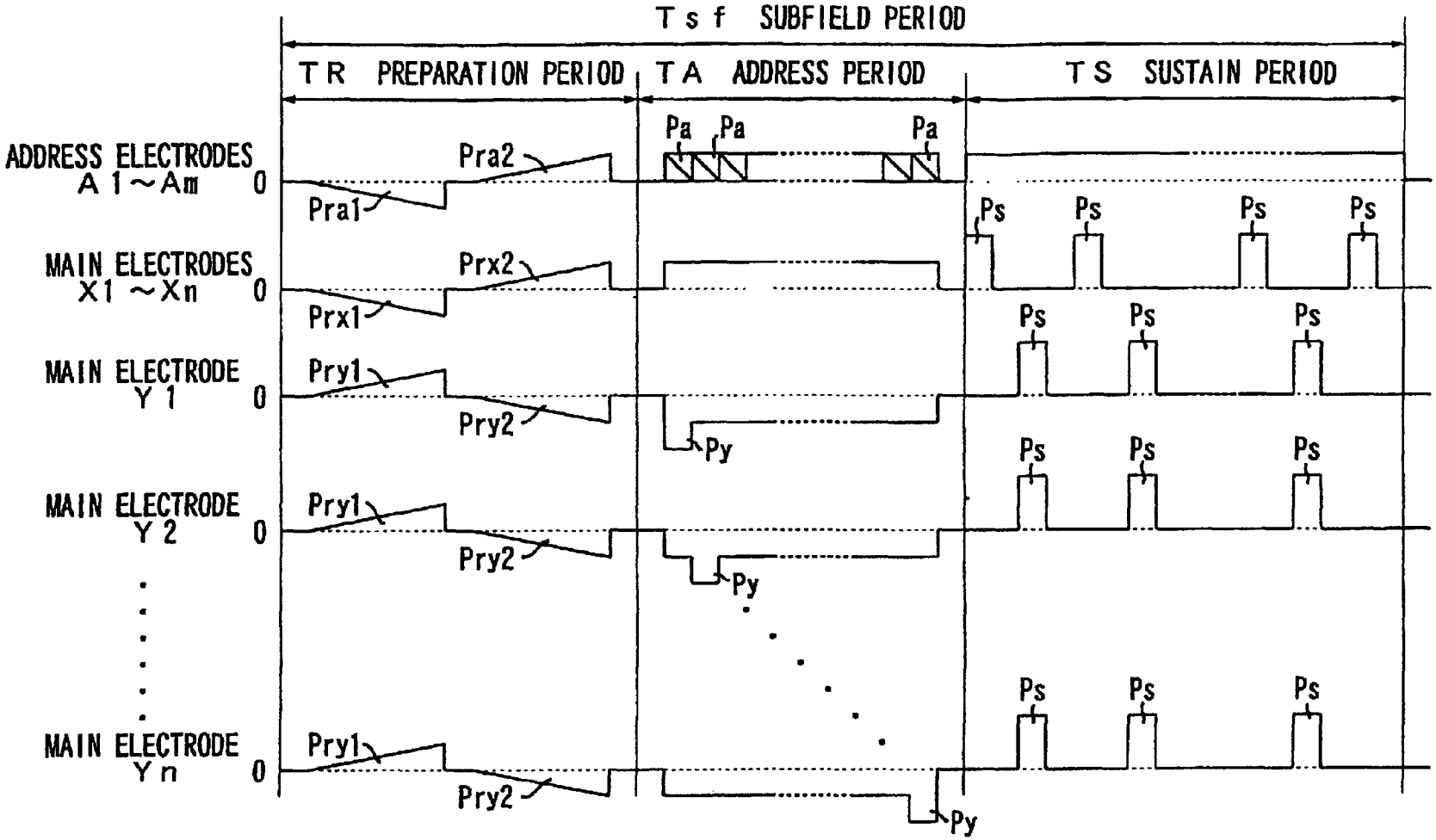
FIG. 6 shows voltage waveforms in a second example of the drive sequence.

FIG. 6 is a diagram of the voltage waveform showing a second example of the drive sequence. This example is an erasing address format, in which the strong discharge occurs in the non-selected cell.

In the preparation period TR, the pulse having the ramp waveform is applied in the same way as the example shown in FIG. 5, so that the wall voltage of the electrode gap XY is controlled to the target value of the preparation process.

In the address period TR, a weak addressing discharge is generated in the selected cell when applying the scanning pulse. The intensity of discharge is set to the value such that the wall voltage of the electrode gap XY after addressing discharge remains within the lighting range. In the non-selected cell, a strong addressing discharge is generated when applying the scanning pulse, so that the wall voltage of the electrode gap XY is changed to a value within the non-lighting range. The intensity of the discharge when applying the scanning pulse is controlled by the potential of the address electrode in the same way as the example shown in FIG. 5.

The wall voltage of the electrode gap XY at the end of the preparation period is set to Vw2 (X side is positive), and the minimum value of the wall voltage of the electrode gap XY for the cell to be lightened in the sustain period TS is set to $V_{TH}$ (absolute value). For the selected cell, the wall voltage of the electrode gap XY is changed by the weak addressing discharge in the range from Vw2 to Vth or more. For the non-selected cell, the wall voltage of the electrode gap XY is changed by the strong addressing discharge to a value higher than $-V_{TH}$ and lower than $V_{TH}$ (preferably zero or a value nearly equal to zero).

An example of the applied voltages is explained as follows. The discharge starting voltage of the electrode gap XY is 220 volts, the discharge starting voltage of the electrode gap AY is 170 volts. Hereinafter, concerning the polarity of the applied voltage and the wall voltage, the X side is regarded as positive in the electrode gap XY, while the A side is regarded as positive in the electrode gap AY.

In the preparation period TR, the widths of the pulses Pra1, Prx1 and Pry1 are 70 μs, the rate of potential change of the electrode gap XY is −6.0V/μs and the final vote thereof is 420V, the ratio of the voltage change of the electoral gap AY is −3.6V/μs and the final voltage thereof is −250V. The wall voltage at the end of the pulse application is 200V for the electrode gap XY and 80V for the electrode gap AY. The widths of the pulses Pra2, Prx2 and Pry2 are 25 μs, the rate of potential change of the electrode gap XY is 2.0V/μs and the final voltage is 50V. The rate of potential change of the electrode gap AY is 5.2V/μs and the final voltage is 130V. The wall voltage at the end of the preparation period is 170V for the electrode gap XY and 40V for the exclude gap AY.

The rate of potential change of the electrode gap AY is 5.2V/μs and the final voltage is 130V. The wall voltage at the end of the preparation period is 170V for the electrode gap XY and 40V for the electrode gap AY.

In the address period TA, the address electrode potential of the strong addressing discharge is 40V, the address electrode potential of the weak addressing discharge is 0V, and the potential of the main electrode X is 0V. The potential of the main electrode Y when the scanning pulse is applied is −100V, while the potential of the main electrode Y when the scanning pulse is not applied is 0V. The wall voltage of the electrode gap XY at the end of the weak addressing discharge is 120V, while the wall voltage of the electrode gap XY at the end of the strong addressing discharge is 0V.

In the sustain period TS, the amplitude of the sustain pulse Ps is 170V, and the address electrode potential is 85V. In this case, the minimum value of the wall voltage for generating the sustaining discharge is 70V.

In this example too, since the addressing discharge at the upstream side of the row selection contributes to the priming in the downstream, the address pulse Pa having the pulse width of 1 μs enables stable addressing.

Figure 7:
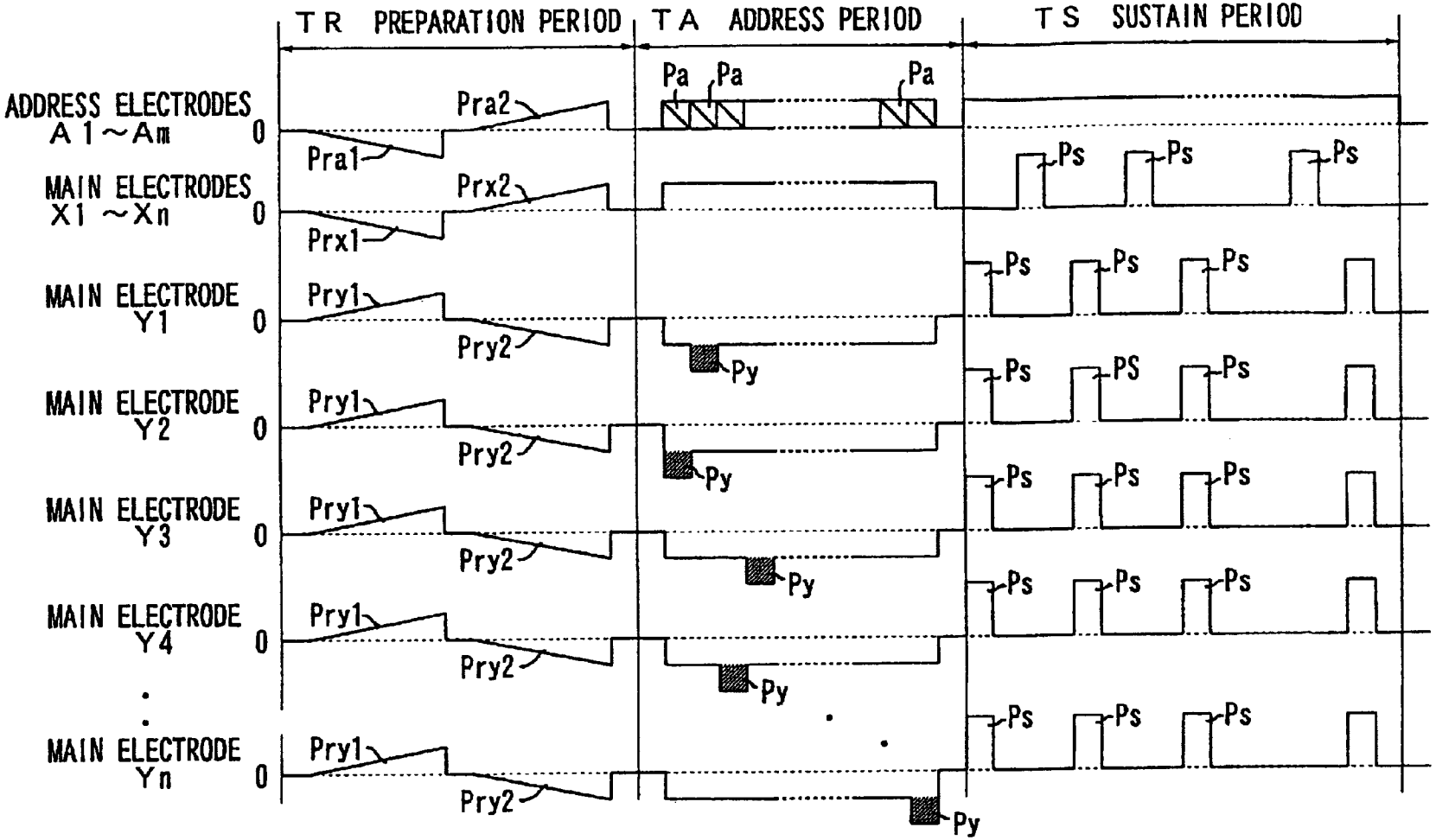
FIG. 7 shows voltage waveforms in a third example of the drive sequence.

FIG. 7 is a diagram of the voltage waveform showing a third example of the drive sequence.

In the addressing, the row selection is not required to perform in the arrangement order. Namely, it is only required that the space charge supplied by the addressing discharge in a certain row is within a distance range that can contribute to the priming effect for the later addressing discharge. In FIG. 7, even rows and odd rows are selected alternately, and the each group of even or odd rows is scanned by the arrangement order from the upper to the lower. When switching from the odd row to the even row, the row selection is performed by skipping two rows. Sufficient priming effect was obtained by the row selection with skipping two rows in the 25 inches and SXGA screen.

Figure 8:
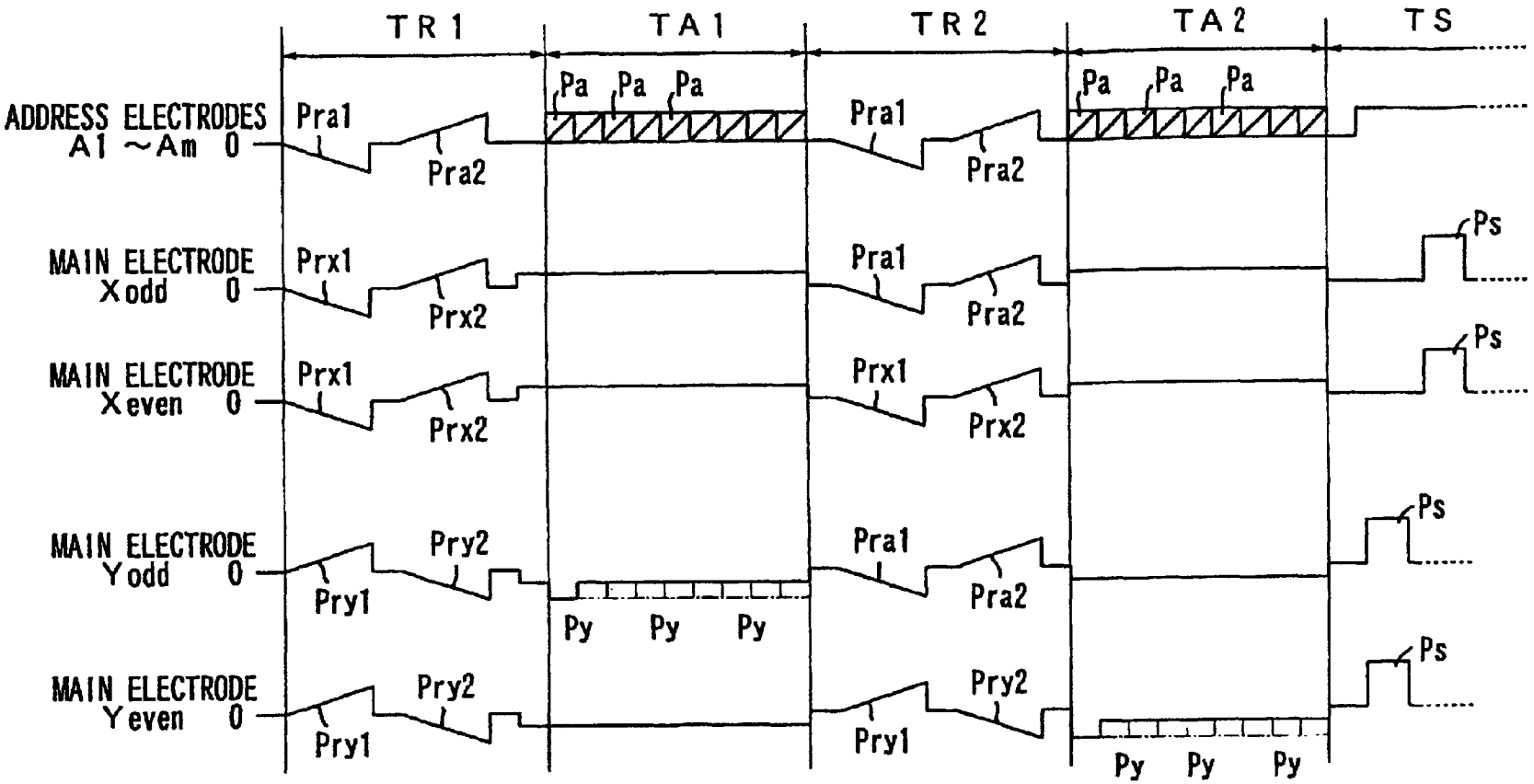
FIG. 8 shows voltage waveforms in a fourth example of the drive sequence.

FIG. 8 is a diagram of the voltage waveform showing a fourth example of the drive sequence.

The rows constituting the screen are divided into the group of odd rows and the group of even rows. The preparation periods TR1, TR2 and the address periods TA1, TA2 are assigned to each group. The sustain period TS is common to both groups.

Dividing the address process into two, the potential of the main electrode X of the selected row can be different from the potential of the main electrode X of the non-selected row that is adjacent to the selected row, so that the propagation of the space charge generated by the addressing discharge along the row direction is controlled.

The second preparation period TR2 is provided for the following purposes. One purpose is to readjust the potential of the even rows since the state of the wall charge of the even rows is disturbed a little by the addressing discharge of the odd rows (the first address process). Another purpose is to supply the priming particle to the addressing discharge of the head of the even row (the second address process).

In the preparation period TR2, only the charges of the even rows are controlled without disturbing the state of the wall charge of the odd rows. For this reason, the pulse applied to the even rows in the preparation period TR2 is the same as the first preparation period TR1, while the pulse applied to the main electrodes X, Y of the odd rows in the preparation period TR2 is the same as the pulses Pra1 and Pra2 applied to the address electrodes A1–Am. Thus, the applied voltage of the electrode gap AY and the electrode gap XY within the cell of the odd rows in the preparation period TR2 becomes zero, so that the state of the wall charge cannot be disturbed.

Figure 9:
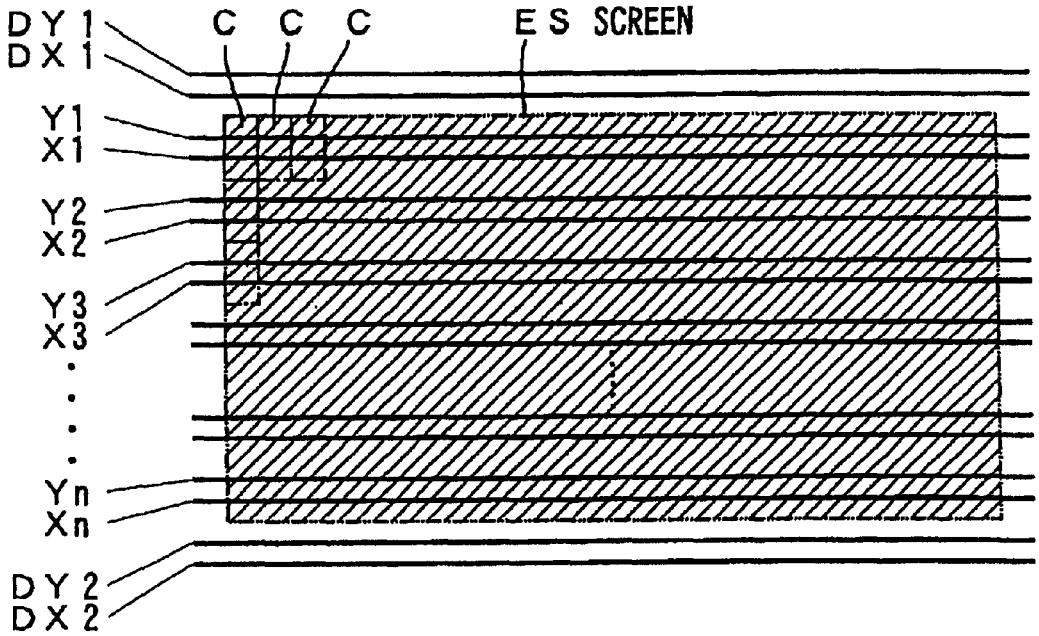
FIG. 9 is a schematic diagram of the main electrode arrangement in accordance with a second embodiment.
Figure 10:
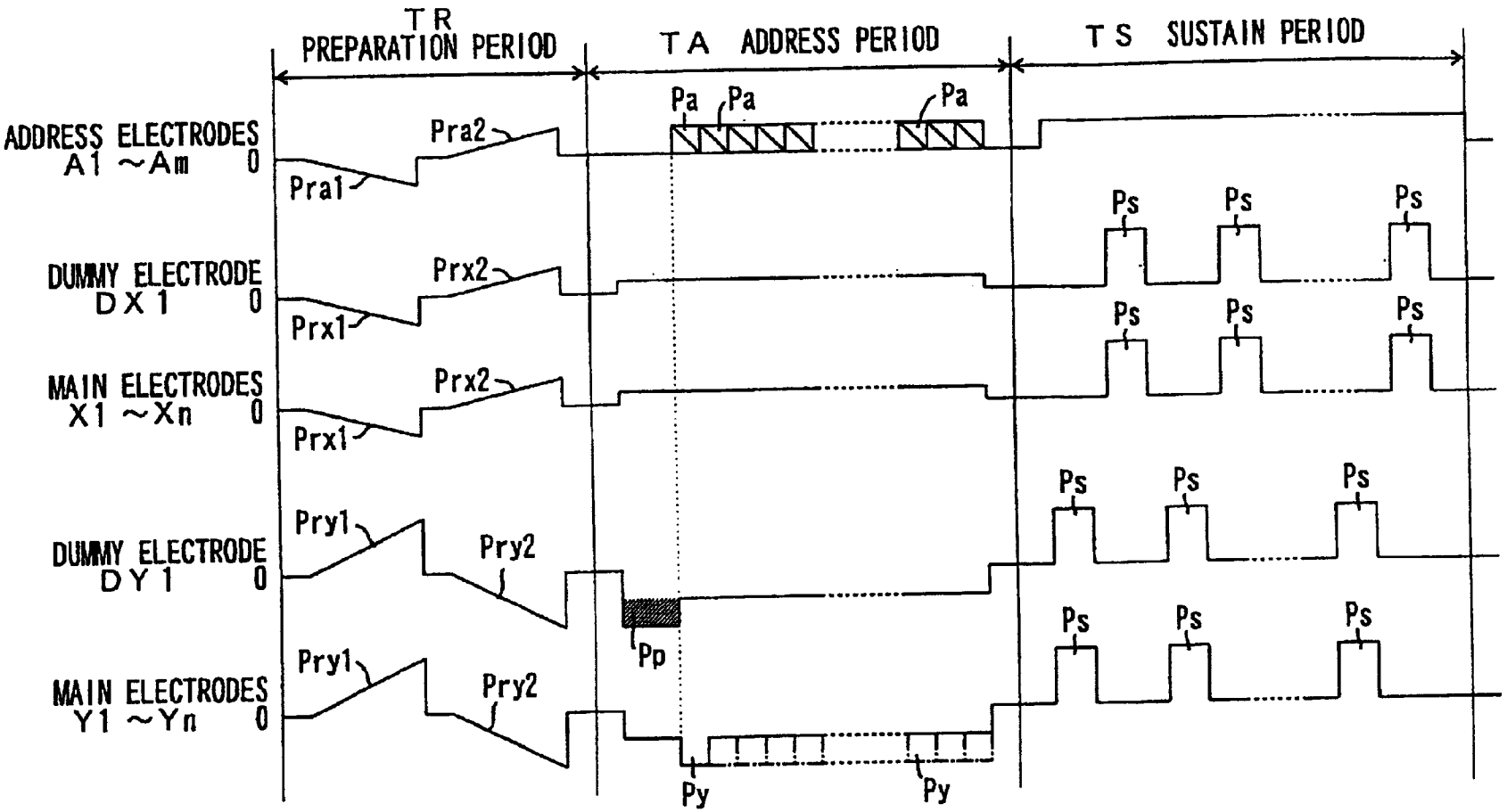
FIG. 10 shows voltage waveforms in a fifth example of the drive sequence.

FIG. 9 is a schematic drawing of the main electrode arrangement of a second embodiment. FIG. 10 shows voltage waveforms of a fifth example of the drive sequence.

In the above-mentioned first to fourth examples, supply of the priming particle to the first addressing discharge in the subfield is performed by the discharge in the preparation process. In order to ensure the supply of the priming particle, it is more effective to generate the priming discharge after the preparation process and before starting the addressing. For example, the outside of the screen ES in the row direction is provided with an auxiliary main electrode (an electrode for priming) that is similar to the main electrodes X, Y so as to generate priming discharge by the auxiliary main electrode. In the example shown in FIG. 9, the auxiliary main electrodes DY1, DX1 are disposed at the outside of the main electrodes Y1, X1 of the first row, and the auxiliary main electrodes DY2, DX2 are disposed at the outside of the main electrodes Yn, Xn of the final row. As shown in FIG. 10, the pulse Pp is applied to the auxiliary main electrode DY1 so as to generate the priming, then the scanning is started from the main electrode Y1 that is closest to the auxiliary main electrode DY1 in the screen. Though the peak value of the pulse Pp is the same as the scanning pulse Py, the pulse width is set longer than the scanning pulse P so as to increase the discharge probability. The arrangement of the pair of auxiliary main electrodes makes the pairs of main electrodes at the first and final rows adjacent to the main electrodes at both sides in the same way as the other pair of main electrodes. Therefore, the discharge condition is uniformed and the display quality is increased.

Figure 11:
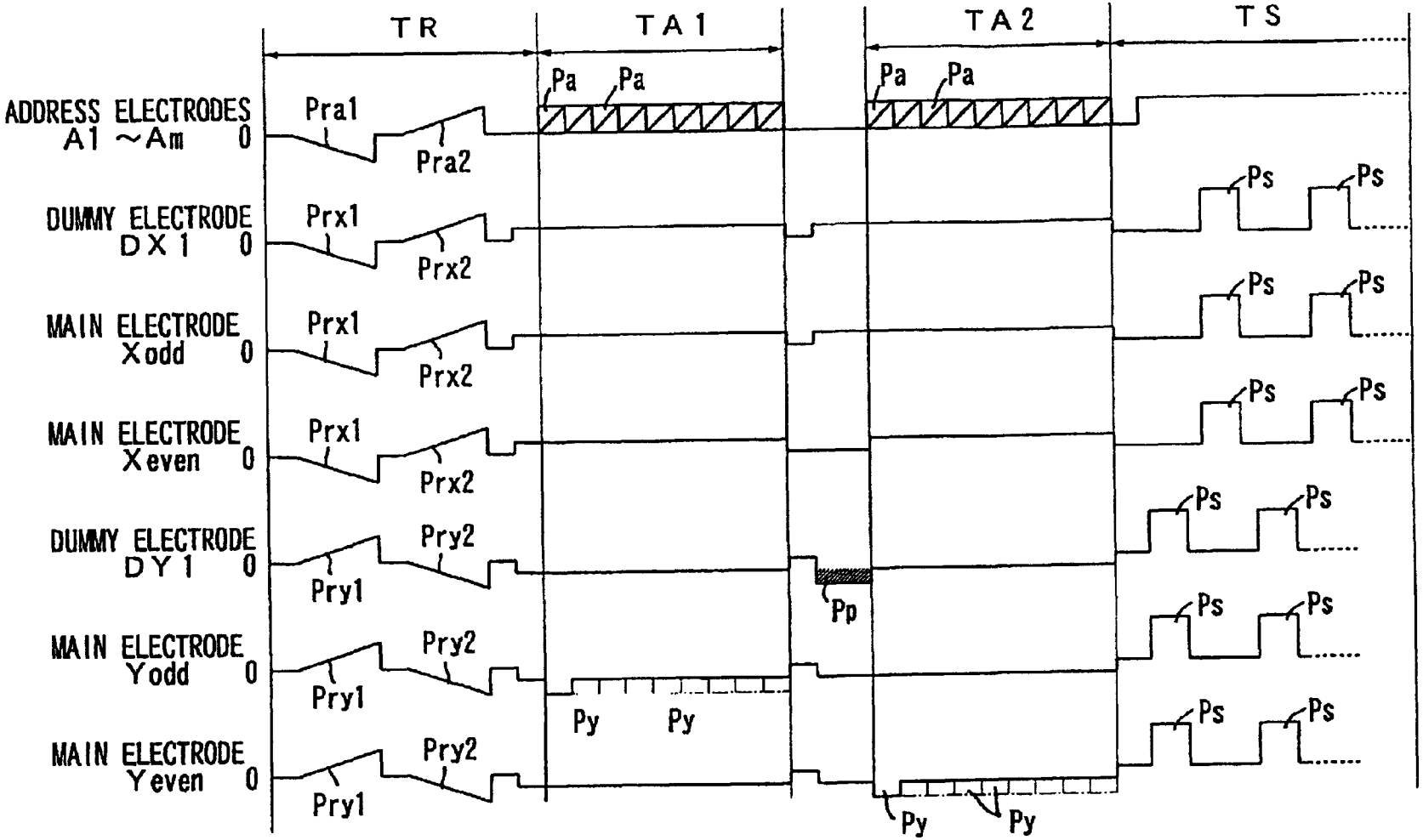
FIG. 11 shows voltage waveforms in a sixth example of the drive sequence.

FIG. 11 is a diagram of the voltage waveform showing a sixth example of the drive sequence.

In the above-mentioned fourth example, the second preparation period TR2 is provided. However, the second preparation period TR2 can be eliminated when the disturbance of the charge state of the even rows by the address process of the odd rows is sufficiently small. It is preferable that in order to supply the priming particle to the first addressing discharge of the latter half of the address process, the pair of auxiliary main electrodes may be used so as to generate the priming discharge before the latter half of the address process. The priming discharge can be generated just before the address process of the odd row.

When the addressing is performed independently for the odd rows and for even rows as explained in the fourth and sixth examples, the main electrodes X of the odd rows can be common and controlled by the first driver, while the main electrodes X of the even rows can be common and controlled by the second driver.

In the above-mentioned embodiments, the target to be driven is the plasma display panel 1 having structure in which the main electrodes X, Y and the address electrode A are covered with the dielectric material. However, the present invention can be also applied to the structure in which either electrode making up a pair is covered with the dielectric material. For example, even in the structure that has no dielectric material for covering the address electrode A, or the structure in which one of the main electrodes X, Y is exposed to the discharge space 30, the sufficient wall voltage can be generated in the electrode gaps XY, AY. The polarity, the value, the application time and the rate of rising change of the applied voltage are not limited to the examples. The the present invention can be applied not only to display devices including the plasma display panel, PALC, but also to gas-discharge devices having other structure without utilizing the memory function by the wall charge. The gas-discharge is not necessarily required to be for display.

What is claimed is:

[1. A method for driving a gas-discharge panel in which line-sequential addressing is performed for setting a state of cells arranged in rows and columns, the method comprising generating a discharge in all cells of a selected row, irrespective of a state to be set in each of the cells for each selection of the row in addressing, an intensity of the discharge in each of the cells of the selected row being set in accordance with state setting data corresponding to each of the cells of the selected row.]

[2. The method according to claim 1, wherein the intensity is set to either a first intensity for cells to be lit during the line-sequential addressing by applying a voltage in the cells to be lit to achieve restart of a discharge in a light sustaining operation or a second intensity for cells not to be lit during the line-sequential addressing by applying a voltage in the cells not to be lit to prohibit restart of a discharge in the light sustaining operation.]

[3. The method according to claim 1, wherein the gas-discharge panel includes scanning electrodes for selecting respective rows and data electrodes for selecting respective columns crossing the rows at respective cells, the scanning electrodes and the data electrodes being covered with a dielectric layer for providing wall voltage, a discharge space being continuous over an entire length of each of the columns, the method further comprising:

applying a preparation pulse to the cells of the selected row before performing the addressing to set a wall voltage of each cell to a predetermined level to perform an addressing preparation;

generating the discharge in a first intensity for cells to be lit during the line-sequential addressing by applying a voltage in the cells to be lit to increase a wall charge level set after the applied preparation pulse to achieve restart of the discharge in a light sustaining operation; and generating the discharge in a second intensity for cells not to be lit during the line-sequential addressing by applying a voltage in the cells not to be lit to decrease a wall charge level set after the applied preparation pulse to prohibit restart of the discharge in the light sustaining operation.]

[4. The method according to claim 3, further comprising:

biasing each of the data electrodes to a first potential or a second potential in accordance with the state setting data of one row synchronizing with a row selection by an independent potential control with respect to each of the scanning electrodes.]

[5. A method for driving a gas-discharge panel in which line-sequential addressing is performed for setting a state of cells arranged in rows and columns so as to constitute a display screen, the method comprising generating a discharge in all cells of a selected row, irrespective of a state to be set in each of the cells for each selection of the row in addressing, an intensity of the discharge in each of the cells of the selected row being set in accordance with state setting data corresponding to each of the cells of the selected row.]

[6. A method for driving a gas-discharge panel having a display screen including cells arranged in rows and columns, a scanning electrode for selecting a corresponding row and a data electrode for selecting a corresponding column crossing at a corresponding cell, one of the scanning electrode and the data electrode being covered with a dielectric layer for providing wall voltage, a discharge space being continuous over an entire length of each of the columns, the method comprising:

performing line-sequential addressing to control the wall voltage of all cells of the screen in accordance with binary display data and sustaining by applying an alternating voltage to all cells of a selected row, repeatedly; and generating a discharge having either a first or a second intensity depending on the display data corresponding to each of the cells of the selected row for each selection of the row in the addressing.]

[7. The method according to claim 6, further comprising:

applying a preparation pulse to the cells of the selected row before performing the addressing so as to perform an addressing preparation for setting the wall voltage of each cell to a predetermined level;

generating the discharge having a first intensity for cells to be lit in the addressing so as to make a level of the wall voltage set in the addressing preparation increase to a sufficient level to regenerate a discharge in a light sustaining operation; and generating the discharge having a second intensity for cells not to be lit in the addressing so as to make the level of the wall voltage set in the addressing preparation decrease to a level such that a discharge cannot restart in the sustaining operation.]

[8. The method according to claim 7, further comprising:

biasing each of the data electrodes to a first potential or a second potential in accordance with the display data of one row synchronizing with the row selection by an independent potential control with respect to each of the scanning electrodes.]

[9. The method according to claim 7, further comprising:

applying a voltage to an electrode gap of the cells generating a discharge in the addressing, in the addressing preparation the voltage increasing from a first set value to a second set value, so as to adjust the wall voltage of the electrode gap by generating plural discharges or a continuous discharge in a rising period of the voltage.]

[10. The method according to claim 6, further comprising:

applying a preparation pulse to the cells of the selected row before performing the addressing so as to perform an addressing preparation for setting the wall voltage of each cell to a predetermined level;

generating the discharge having a first intensity for cells to be lit in the addressing so as to make a level of the wall voltage set in the addressing preparation maintain a sufficient level to regenerate a discharge in a light sustaining operation; and generating the discharge having a second intensity for cells not to be lit in the addressing so as to make the level of the wall voltage set in the addressing preparation decrease to a level such that a discharge cannot restart in the sustaining operation.]

[11. The method according to claim 10, further comprising:

biasing each of the data electrodes to a first potential or a second potential in accordance with the display data of one row synchronizing with the row selection by an independent potential control with respect to each of the scanning electrodes.]

[12. The method according to claim 10, further comprising:

applying a voltage to an electrode gap of the cells generating a discharge in the addressing, in the addressing preparation the voltage increasing from a first set value to a second set value, so as to adjust the wall voltage of the electrode gap by generating plural discharges or a continuous discharge in a rising period of the voltage.]

[13. The method according to claim 6, further comprising:

biasing each of the data electrodes to a first potential or a second potential in accordance with the display data of one row synchronizing with the row selection by an independent potential control with respect to each of the scanning electrodes.]

[14. The method according to claim 6, wherein the discharge is generated one time in the cells of the selected row in the addressing.]

[15. The method according to claim 6, wherein the row selection is performed in a order such that in a second row selection and after the second row selection the discharge in a former row selection become effective as a priming discharge.]

[16. The method according to claim 6, further comprising:

dividing the rows of the screen into a group of odd rows and a group of even rows;

addressing each group by time sharing; and applying a voltage to all cells of the latter group between the addressing of the former group and the addressing of the latter group, so as to generate a priming discharge.]

[17. The method according to claim 6, further comprising:

disposing one or more auxiliary electrodes that are similar to the scanning electrode at the outside of the screen in a row direction; and applying a voltage to the one or more auxiliary electrodes in the addressing for generating a priming discharge before a first row selection.]

[18. The method according to claim 17, further comprising:

dividing the rows of the screen into a group of odd rows and a group of even rows; addressing each group by time sharing; and applying a voltage to the one or more auxiliary electrodes close to the row that is selected first in the latter group between the addressing of the former group and the addressing of the latter group, so as to generate the priming discharge.]

[19. A display device comprising:

a gas-discharge panel having a display screen including cells arranged in rows and columns, and having a structure in which a scanning electrode for selecting a corresponding row and a data electrode for selecting a corresponding column cross each other at a corresponding cell, at least one of the scanning electrode and data electrode is covered with a dielectric layer for providing a wall voltage, and a discharge space is continuous over an entire length of each of the columns;

a drive circuit performing line-sequential addressing to control the wall voltage of all cells of the display screen in accordance with binary display data, and sustaining by applying the alternating voltage to all cells of a selected row, wherein the drive circuit generates a discharge having either a first intensity or a second intensity depending on the display data corresponding to each of the cells of the selected row for each selection of the row as the addressing.]

[20. The display device according to claim 19, further comprising:

a drive circuit that applies a voltage to an electrode gap of the cells generating a discharge in the addressing, in an addressing preparation, the voltage increasing from a first set value to a second set value, the drive circuit adjusting the wall voltage of the electrode gap by generating plural discharges or a continuous discharge in a rising period of the voltage as the addressing preparation.]

[21. A method for driving a gas-discharge panel in which point-sequential addressing is performed for setting a state of cells arranged in rows and columns, the method comprising:

generating a discharge in a selected cell, irrespective of a state to be set in the cell for each selection in the addressing, an intensity of the discharge in the cell being set in accordance with state setting data corresponding to the cell.]

[22. A method for driving a gas-discharge panel in which a plurality of discharge cells each having a memory function produced by a wall charge are arranged in a matrix, the method comprising:

applying a predetermined preparation pulse to all of the discharge cells arranged in the matrix, simultaneously, so as to set a wall charge of each of the discharge cells to a predetermined level;

addressing to make the discharge cells of the matrix forming the wall charge perform line-sequential addressing discharges;

displaying by applying a predetermined sustain pulse to the discharge cells arranged in the matrix, so as to make the addressed discharge cells perform sustain discharges; and the addressing including generating a discharge in the discharge cells of the matrix, wherein a discharge of a first intensity is generated in the discharge cells to be addressed by applying a voltage producing a discharges having a level sufficient to store sufficient wall charge for restarting the discharges in the displaying, while a discharge of a second intensity is generated in the discharge cells not to be addressed, the second intensity lowering a level of the wall charge set in the applying to a level that disables restarting the discharge in the displaying.]

[23. A method for driving a gas-discharge panel in which a plurality of discharge cells, each having a memory function produced by a wall charge, are arranged in a matrix, the method comprising:

applying a preparation pulse, simultaneously to all of the discharge cells arranged in the matrix to set a wall charge of each of the discharge cells to a first level; and addressing the discharge cells to perform line-sequential addressing discharges, the addressing including generating a first intensity discharge or a second intensity discharge in the discharge cells of the matrix, wherein a first intensity discharge is generated in the discharge cells to be lit by applying a voltage in the discharge cells to be lit to increase the wall charge level to a second level greater than the first level set after the applied preparation pulse to achieve restart of a discharge in a light sustaining operation and a second intensity discharge is generated in the discharge cells not to be lit by applying a voltage in the discharge cells not to be lit to lower a wall charge level to a third level less than the first level set after the applied preparation pulse to prohibit restart of a discharge in the light sustaining operation.]

[24. A method for driving a gas-discharge panel having a display screen including cells arranged in rows and columns, a scanning electrode for selecting a corresponding row and a data electrode for selecting a corresponding column crossing at a corresponding cell, the scanning electrode making a main electrode pair with a third electrode at respective corresponding cells, at least two of the two electrodes making the main electrode pair and the data electrode being covered with a dielectric layer for providing wall voltage, the method comprising:

performing an addressing preparation to initialize the wall voltage of all cells of the screen, performing line-sequential addressing to control the wall voltage of all cells of the screen in accordance with binary display data and sustaining by applying an alternating voltage to all cells of a selected row, repeatedly;

applying a voltage to at least one of electrode gaps of the cells generating a discharge in the addressing, in the addressing preparation the voltage increasing from a first set value to a second set value, so as to adjust the wall voltage of the electrode gap by generating plural discharges or a continuous discharge in a rising period of the voltage; and setting the voltage to be applied to the electrode gap to which the increasing voltage is applied higher than the second set value irrespective of a value of display data, when a scanning pulse for selecting a corresponding row is applied to the scanning electrode in the addressing.]

[25. The method according to claim 24, wherein the electrode gap to which the increasing voltage is applied is the electrode gap of the main electrode pair.]

[26. The method according to claim 24, wherein a discharge space of the gas-discharge panel is continuous over an entire length of each of the columns.]

*27. A method for driving a plasma display panel in which an address electrode and a pair of main electrodes including a scan electrode define a display cell, and displaying a frame which includes a plurality of subfields, at least one subfields having an addressing preparation period and an addressing period, the method comprising: applying a voltage changing with time between the address electrode and the scan electrode in the addressing preparation period and attained voltage of the voltage is equal to or less than the discharge starting voltage between the address electrode and the scan electrode; applying an address voltage to the address electrode and a scan voltage to the scan electrode during the addressing period, wherein the voltage between the address electrode and the scan electrode during the addressing period is greater than the attained voltage during the addressing preparation period.*

*28. A method for driving a plasma display panel in which an address electrode and a pair of main electrodes including a scan electrode define a display cell, and displaying a frame which includes a plurality of subfields, at least one subfields having an addressing preparation period and an addressing period, the method comprising: applying a first voltage changing to positive direction and a second voltage changing to negative direction to the scan electrode applying an address pulse to address electrode and a scan pulse to the scan electrode wherein attained voltage between the main electrodes during applying the first voltage is greater than discharge start voltage between the main electrodes, and attained voltage between the main electrodes during applying the second voltage which is less than the discharge starting voltage.*

*29. A method according to claim 27, wherein the amount of the wall voltage between the address electrode and the scan electrode is equal to 0v after the voltage is applied in the addressing preparation period.*

*30. A method according to claim 27, wherein the amount of the wall voltage between the address electrode and the scan electrode is equal to 0 volts after the voltage changing with time is applied in the addressing preparation period when the attained voltage of the ramp voltage with time is equal to the discharge starting voltage between the address electrode and the scan electrode.*

*31. A method according to claim 27, wherein the voltage applied to the address electrode is relatively positive to the voltage applied to the scan electrode in the addressing preparation period.*

*32. A method according to claim 27, wherein the voltage applied to the address electrode is relatively positive to the voltage applied to the scan electrode in the addressing period.*

*33. A method according to claim 27, wherein the voltage changing with time includes ramp waveform, obtuse waveform and step-like waveform.*

*34. A method according to claim 27, wherein during the addressing period the pulse width applied to the address electrode is not greater than* 1 μs.

*35. A method according to claim 28, wherein the first voltage attains to positive voltage and the second voltage attains to negative voltage.*

*36. A method according to claim 28, wherein a polarity of voltage applied between the pair of main electrodes when the first voltage is applied are opposite to a polarity of voltage applied between the pair of main electrodes when the second voltage is applied.*

*37. A method according to claim 28, wherein a polarity of voltage applied between the address electrode and the scan electrode when the first voltage is applied are opposite to a polarity of voltage applied between the address electrode and the scan electrode when the second voltage is applied.*

*38. A method according to claim 27, wherein during the addressing preparation period adjustment of wall voltage is performed for both the electrode gap between the main electrodes and the electrode gap between the address electrode and the scan electrode.*

*39. A method for driving a plasma display panel in which addressing is performed for cells arranged in rows and columns to be lit, the method comprising: applying at least a pulse changing voltage with time to cause discharge in the cell before the addressing is performed; applying an addressing pulse to the cells to be lit; wherein the pulse applied in the cell before the addressing has voltage which is not greater than the discharge start voltage in the cell.*

*40. A method for driving a plasma display panel according to claim 42, wherein the pulse changing voltage with time is ramp waveform, obtuse waveform, or step-like waveform.*

*41. A method for driving a plasma display panel according to claim 39, wherein the addressing pulse has pulse width of 1 μs which enables the addressing.*

*42. A method for driving a plasma display panel according to claim 39, wherein the addressing pulse is applied to each one of every two rows.*

*43. A method for driving a plasma display panel according to claim 39, wherein the discharge caused by the pulse changing voltage with time supplies priming particle to the cell.*

* * * * *